United States Patent
Walters et al.

(10) Patent No.: US 9,961,071 B2
(45) Date of Patent: *May 1, 2018

(54) NATIVE APPLICATION SINGLE SIGN-ON

(71) Applicant: Intermedia.net, Inc., Mountain View, CA (US)

(72) Inventors: Richard John Walters, Benson (GB); Simon David Knott, Bristol (GB)

(73) Assignee: Intermedia.net, Inc., Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/219,687

(22) Filed: Jul. 26, 2016

(65) Prior Publication Data

US 2016/0337340 A1    Nov. 17, 2016

Related U.S. Application Data

(63) Continuation of application No. 14/556,391, filed on Dec. 1, 2014, now Pat. No. 9,432,334.

(51) Int. Cl.
*H04L 29/06* (2006.01)
*H04L 29/08* (2006.01)
*H04L 12/46* (2006.01)

(52) U.S. Cl.
CPC ...... *H04L 63/0815* (2013.01); *H04L 12/4641* (2013.01); *H04L 63/0272* (2013.01); *H04L 67/02* (2013.01); *H04L 67/26* (2013.01)

(58) Field of Classification Search
CPC . H04L 63/0815; H04L 63/0272; H04L 67/02; H04L 12/4641
See application file for complete search history.

(56) References Cited

U.S. PATENT DOCUMENTS 7,676,829 B1    3/2010 Gui et al.
9,432,334 B2    8/2016 Walters et al.
(Continued)

FOREIGN PATENT DOCUMENTS

WO    WO-2016089536 A1    6/2016

OTHER PUBLICATIONS

"U.S. Appl. No. 14/55,391, Response filed Apr. 15, 2016 to Non-Final Office Action dated Jan. 20, 2016", 12 pgs.
(Continued)

*Primary Examiner* — Beemnet Dada
(74) *Attorney, Agent, or Firm* — Schwegman Lundberg & Woessner, P.A.

(57) ABSTRACT

In an example embodiment, a virtual private network (VPN) connection is established between a client device and an authentication service. Then a request is received from a third-party application on the client device, with the request being for a third-party service. A log-in page is requested from the third-party service, with the log-in page including one or more log-in fields usable to enter credential information. The log-in page is then modified to hide the one or more log-in fields. Credentials corresponding to a user of the client device and also corresponding to the third-party service are then obtained. The modified log-in page is sent to the client device via the VPN connection. A log-in submission is received from the third-party application. The credentials corresponding to the user and to the third-party service are sent to the third-party service to log-in the user to the third-party service.

16 Claims, 14 Drawing Sheets

(56) References Cited

U.S. PATENT DOCUMENTS

| | | |
|---|---|---|
| 2007/0136573 A1 | 6/2007 | Steinberg |
| 2009/0249439 A1 | 10/2009 | Olden et al. |
| 2010/0318806 A1* | 12/2010 | Hardt .................. G06F 21/41 713/176 |
| 2011/0277026 A1* | 11/2011 | Agarwal ................ G06F 21/41 726/8 |
| 2013/0007456 A1 | 1/2013 | Dean et al. |
| 2014/0006960 A1 | 1/2014 | Kumar et al. |
| 2014/0013603 A1 | 1/2014 | Miyachi et al. |
| 2014/0123231 A1* | 5/2014 | Low ................... H04L 63/0892 726/4 |
| 2016/0156592 A1 | 6/2016 | Walters et al. |

OTHER PUBLICATIONS

"U.S. Appl. No. 14/556,391, Non Final Office Action dated Jan. 20, 2016", 9 pgs.
"U.S. Appl. No. 14/556,391, Notice of Allowance dated May 6, 2016", 7 pgs.
"International Application Serial No. PCT/US2015/059155, International Search Report dated Jan. 13, 2016", 2 pgs.
"International Application Serial No. PCT/US2015/059155, Written Opinion dated Jan. 13, 2016", 8 pgs.
"International Application Serial No. PCT/US2015/059155, International Preliminary Report on Patentability dated Jun. 15, 2017", 10 pgs.

\* cited by examiner

NATIVE APPLICATION SINGLE SIGN-ON

RELATED APPLICATIONS

This application is a continuation of U.S. patent application Ser. No. 14/556,391, filed Dec. 1, 2014, the content of which is incorporated herein by reference in its entirety.

TECHNICAL FIELD

This application relates generally to computer networks. More specifically, this application relates to single sign-on from native applications.

BACKGROUND

Single sign-on is a property of access control of multiple related, but independent, software systems. Using single sign-on, a user is able to log in a single time and gain access to all the systems without being prompted to log-in again at each of them. This is typically accomplished using the Lightweight Directory Access Protocol (LDAP) and stored LDAP databases on servers. This solution, however, requires installation of a client program on the user's device, typically in the form of a plug-in to a web browser. There are circumstances, however, where installation of a client program on the user's device is not possible or not desirable, such as where the user wishes to use single sign on in conjunction with a native application running on his or her device. This is despite the fact that many times the native application presents information, such as log-in screens, to the user in the form of web pages (e.g., HyperText Markup Language (HTML) pages). A native application is a full application running outside of a web browser context and typically does not allow for plug-ins or other third-party alterations of functioning. These circumstances are occurring more frequently with the rise in popularity of mobile devices, where many companies are now providing full applications for download that allow connections to their services without requiring the use of web browser.

BRIEF DESCRIPTION OF DRAWINGS

The present disclosure is illustrated by way of example and not limitation in the figures of the accompanying drawings, in which like references indicate similar elements and in which:

FIG. 9 is a block diagram illustrating a system, in accordance with an example embodiment, providing multi-credential support for partial single sign-on.

FIG. 11 is a flow diagram illustrating a method, in accordance with an example embodiment, of providing full single sign-on.

FIG. 12 is a flow diagram illustrating a method, in accordance with an example embodiment, of providing partial single sign-on.

DETAILED DESCRIPTION

Overview

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, various techniques are utilized in order to allow users of native applications on client devices to access multiple services using single sign-on. Various embodiments are discussed, including embodiments where the native applications utilize web pages in the log-in process, embodiments where the native applications do not utilize web pages in the log-in process, and embodiments where a user is allowed to select from multiple credentials in the log-in process.

Figure 1:
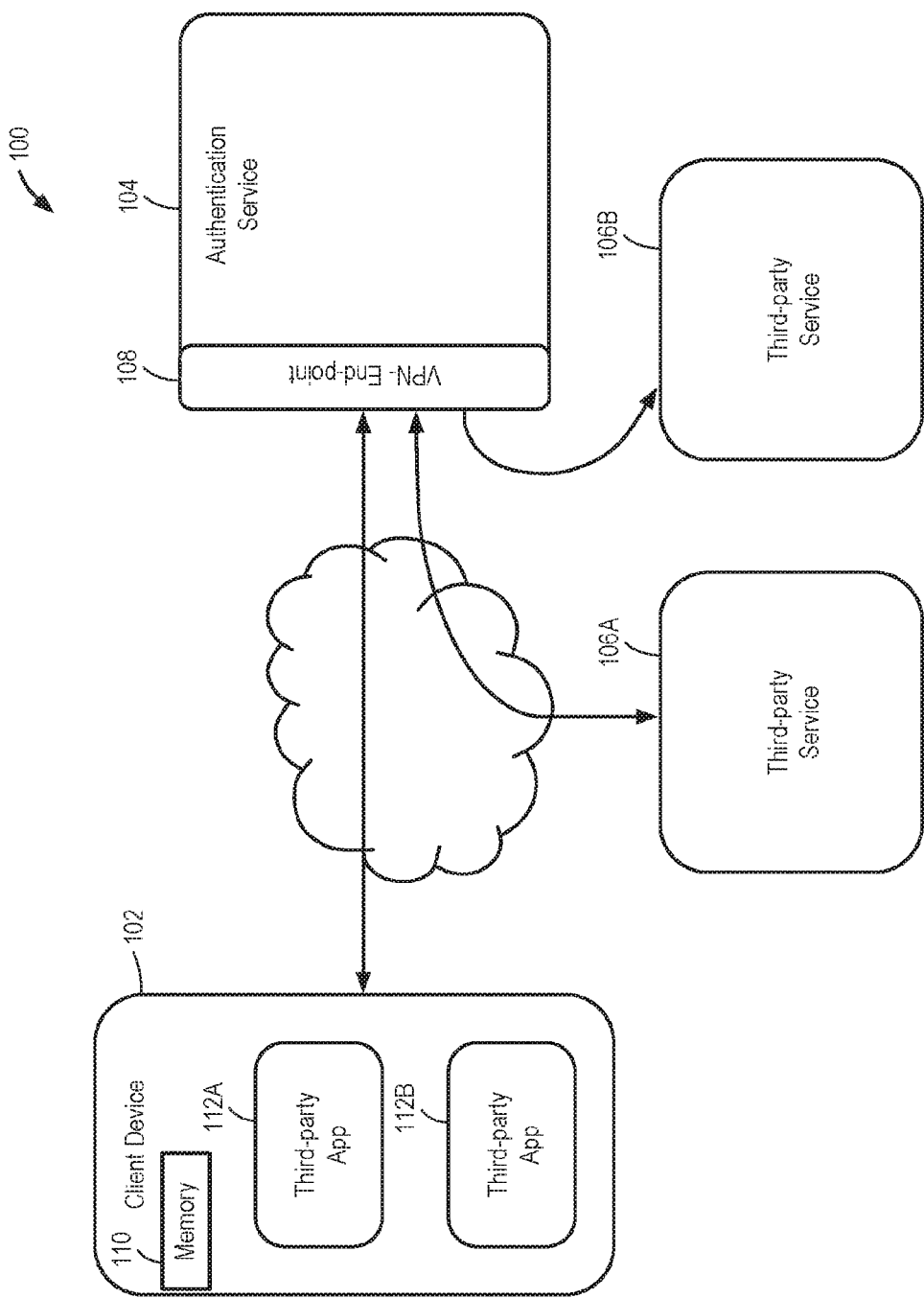
FIG. 1 is a block diagram illustrating a system, in accordance with an example embodiment.

FIG. 1 is a block diagram illustrating a system 100, in accordance with an example embodiment. The system may include a client device 102, an authentication service 104, and one or more third-party services 106A, 106B. The client device 102 may be, for example, a mobile device such as a smartphone or tablet, or a more traditional computing device, such as a laptop or desktop computer. The client device 102 may connect to the authentication service 104 via a virtual private network (VPN) endpoint 108. In order to access the VPN endpoint 108, the client device 102 may store various VPN settings in a memory 110. In some example embodiments, a VPN driver or other software may be installed on the client device 102 in order to facilitate a VPN connection between the client device 102 and the authentication service 104.

The client device 102 may also contain one or more third-party applications 112A, 112B, sometimes called "apps." Each application 112A, 112B may represent a client application for a corresponding server application running on a different third-party service 106A, 106B. Thus, for example, third-party application 112A may be a client application for a server application running on third-party service 106A, while third-party application 112B may be a client application for a server application running on third-party service 106B.

In this example embodiment, one or more of the third-party applications 112A, 112B may utilize a web page, such as an HTML page, when providing users with the ability to log-in to obtain services from the corresponding third-party service 106A, 106B. Thus, for example, third-party application 112A may ordinarily present a user with a web page having a text box where the user can enter a user name and a separate text box where the user can enter a password. Of course, user names and passwords are merely one example of different types of credentials that can be entered by users to enable log-in on the third-party services 106A, 106B. For purposes of this document, the web page can ordinarily present the user with the ability to enter or provide credentials of some sort via the web page, regardless of the type of credential.

Figure 2:
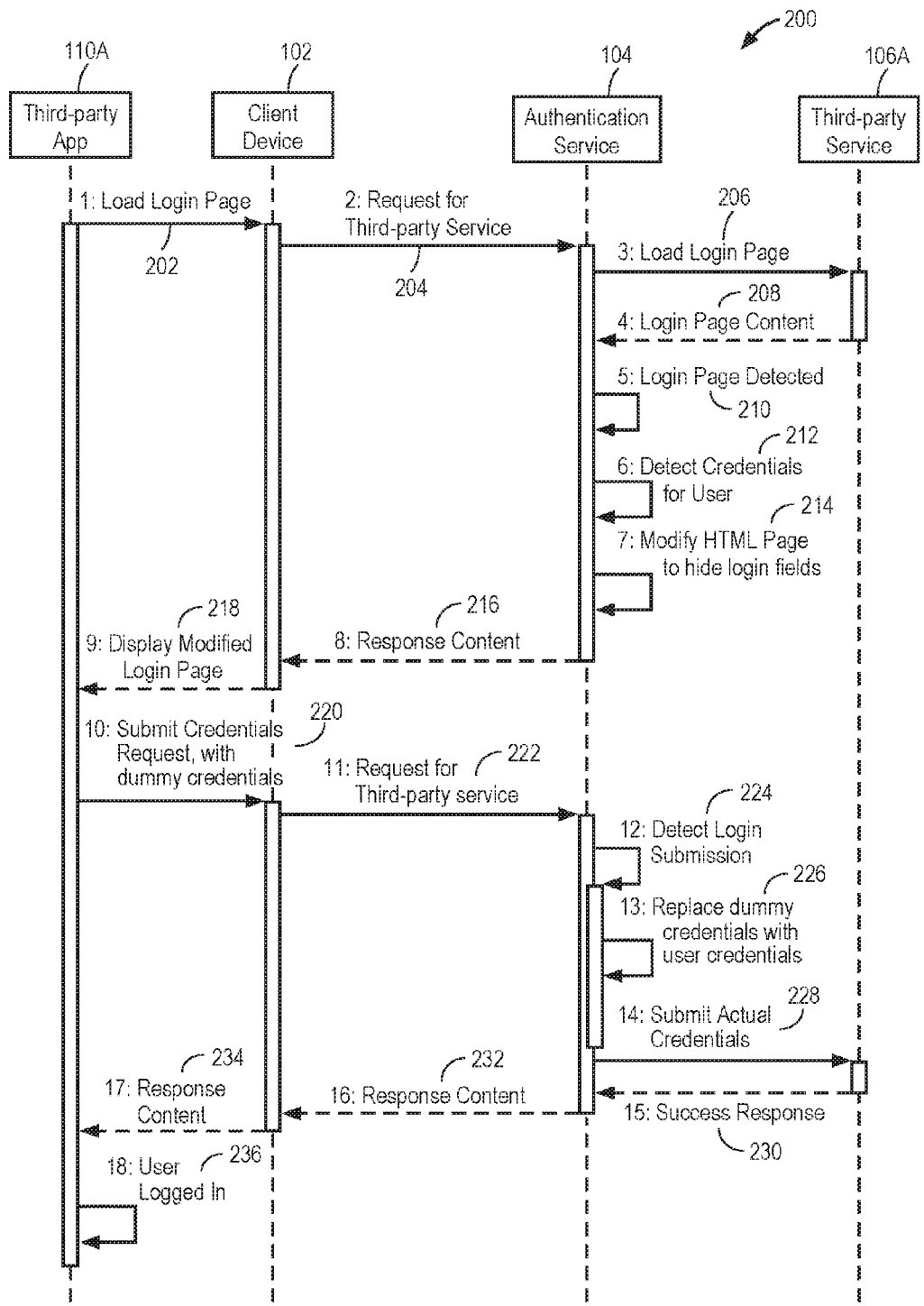
FIG. 2 is a sequence diagram illustrating a method, in accordance with an example embodiment, of full single sign-on using a single credential.

FIG. 2 is a sequence diagram illustrating a method 200, in accordance with an example embodiment, of full single sign-on using a single credential. This sequence diagram describes a method 200 that operates in the system of FIG. 1, described above. Specifically, this sequence diagram describes a method 200 that operates in a system where one or more of the third-party applications 112A, 112B ordinarily utilize a web page to present the user with the ability to enter or provide credentials.

The method 200 is depicted as utilizing third-party application 112A, client device 102, authentication service 104, and third-party service 106A, although one of ordinary skill in the art will recognize that a similar method can be performed using third-party application 112B, client device 102, authentication service 104, and third-party service 106B.

At operation 202, the third-party application 112A attempts to load a log-in page by sending a request to the mobile device 102. In an example embodiment, this may be performed upon the user starting up the third-party application 112A. At operation 204, the client device 102 may then send a request for third-party service 106A to the authentication service 104. This request may be sent via a VPN connection between the client device 102 and the authentication service 104. In instances where the VPN connection is not yet established, the client device 102 may act to establish the VPN connection with the authentication service 104. This may be performed by using a VPN driver and/or other settings stored on the client device 102 and prompting the user for VPN credentials. In a sense, the VPN credentials act as the sole log-in credentials used for the user to access multiple third-party services 106A, 106B, although in some cases the VPN connection is already established by the time the user attempts to log-in. The request sent via the VPN connection may include an indication of the third-party service 106A with which the third-party application 112A is associated.

The VPN driver and other settings stored on the client device 102 may act to cause a request from third-party application 112A intended for the third-party service 106A to instead be rerouted to the authentication service 104. At operation 206, the authentication service 104 may send a request for the log-in page to the third-party service 106. This information can be gleaned from the indication of the third-party service 106A with which the third-party application 112A is associated from the request from the client device 102. In some instances, the authentication service 104 may access a mapping or directory that provides the location of the third-party service 106A using the indication, such as a name of the third-party service.

At operation 208, the third-party service 106A returns the log-in page to the authentication service 104. At operation 210, the authentication service 104 detects the log-in page. This may include, for example, scanning the log-in page to determine what type of credentials the third-party service 106A is requesting in order to allow the user to log-in. For example, the authentication service 104 may scan a log-in page and determine that the log-in page has input boxes for user name and password and therefore determine that user name and password for the user are needed in order to complete the log-in page.

At operation 212, the authentication service 104 detects appropriate credentials for the user. This may include, for example, performing a look-up on a table or other data structure where user credentials for the user for this third-party service are stored. In some example embodiments, each user has a unique supported-application profile stored in a persistent store. In some example embodiments, the user may have provided the authentication service 104 with appropriate log-in credentials for the third-party service 106A at some point in the past. This providing may either be knowingly or non-knowingly. For example, the user may be prompted by the authentication service 104 the first time the user attempts to log-in to the third-party service 106A to provide the log-in credentials. In another example, the authentication service 104 may simply monitor the user entering his or her log-in credentials the first time the user attempts to log-in to the third-party service 106. In another example, the authentication service 104 may provide user details directly to the third-party service 106A, which may share the user's log-in credentials directly with the authentication service 104.

At operation 214, the authentication service may modify the log-in page to hide the log-in fields. In an example embodiment, this may involve stripping HTML code for the log-in fields from the log-in page. This operation may vary greatly, however, depending on the form in which the credentials are to be provided and the typical process that the log-in page uses for the user to provide those credentials. Whatever mechanism is typically used for providing the credentials is hidden or removed so that a user, upon viewing or running the log-in page, does not perceive that the credentials are being requested.

At operation 216, the authentication service 104 may return response content including the modified log-in page to the client device 102. At operation 218, the mobile device may cause the display of the modified log-in page in the third-party application 112A.

At operation 220, the third-party application 112A may submit a credentials request to the client device 102. This request may include, in some example embodiments, dummy credentials along with whatever other parameters are passed via the log-in page. This request may be generated based on user action, such as the user clicking a log-in button on the modified log-in page. At operation 222, the client device 102 submits a request for the third-party service 112A to the authentication service 104. At operation 224, the authentication service 104 detects the log-in submission. At operation 226, the authentication service 104 may replace the dummy credentials with the actual user credentials detected in operation 212. At operation 228, the actual credentials, along with whatever other parameters are passed via the log-in page, are submitted to the third-party service 106A.

At operation 230, after verifying the actual credentials, the third-party service 106A may send a success response to the authentication service 104. At operation 232, the authentication service 104 may send this response content to the client device 102, which at operation 234 passes it to the client application 112A. At operation 236, the client application 112A may notify the user that he or she has been logged in.

Figure 3:
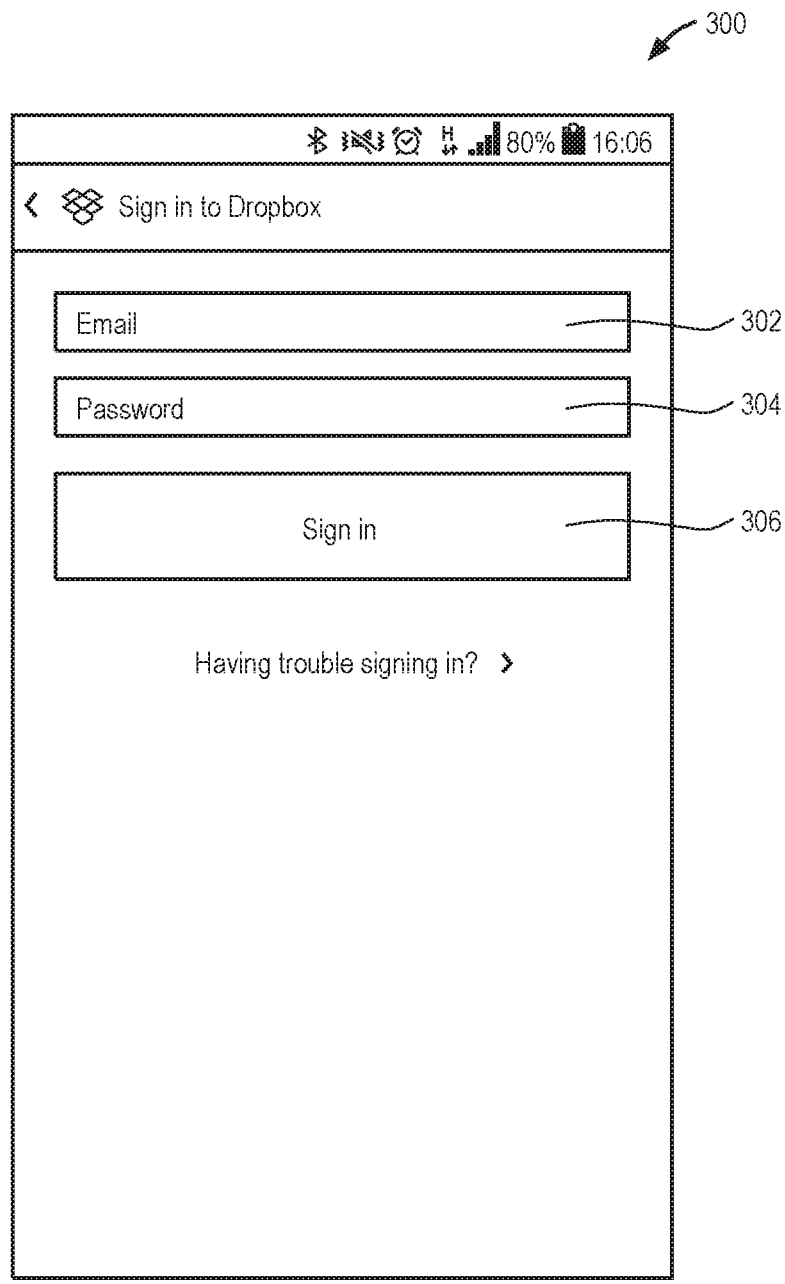
FIG. 3 is a screen capture illustrating an example of a log-in page, in accordance with an example embodiment.

FIG. 3 is a screen capture illustrating an example of a log-in page 300, in accordance with an example embodiment. In some circumstances in the example embodiment, this log-in screen represents what ordinarily would have been presented to the user but is not, although in some circumstances this log-in page 300 may be presented to the user the first time the user attempts to access a particular third-party service 106A, 106B but not on subsequent attempts. Thus, in some example embodiments, the log-in page 300 represents the log-in page that is returned by third-party service 106A in operation 208 of FIG. 2, described above.

As can be seen, the log-in page 300 includes an input box 302 where the user can enter an email address and an input box 304 where the user can enter a password. The email address and password in this case represent the credentials needed by the underlying third-party service 106A, 106B in order for the user to utilize the service. The log-in page 300 may also include a button 306 that the user presses to indicate his intention to sign-in to the third-party service 106A, 106B (typically after the user has entered the email address in input box 302 and the password in input box 304.

Figure 4:
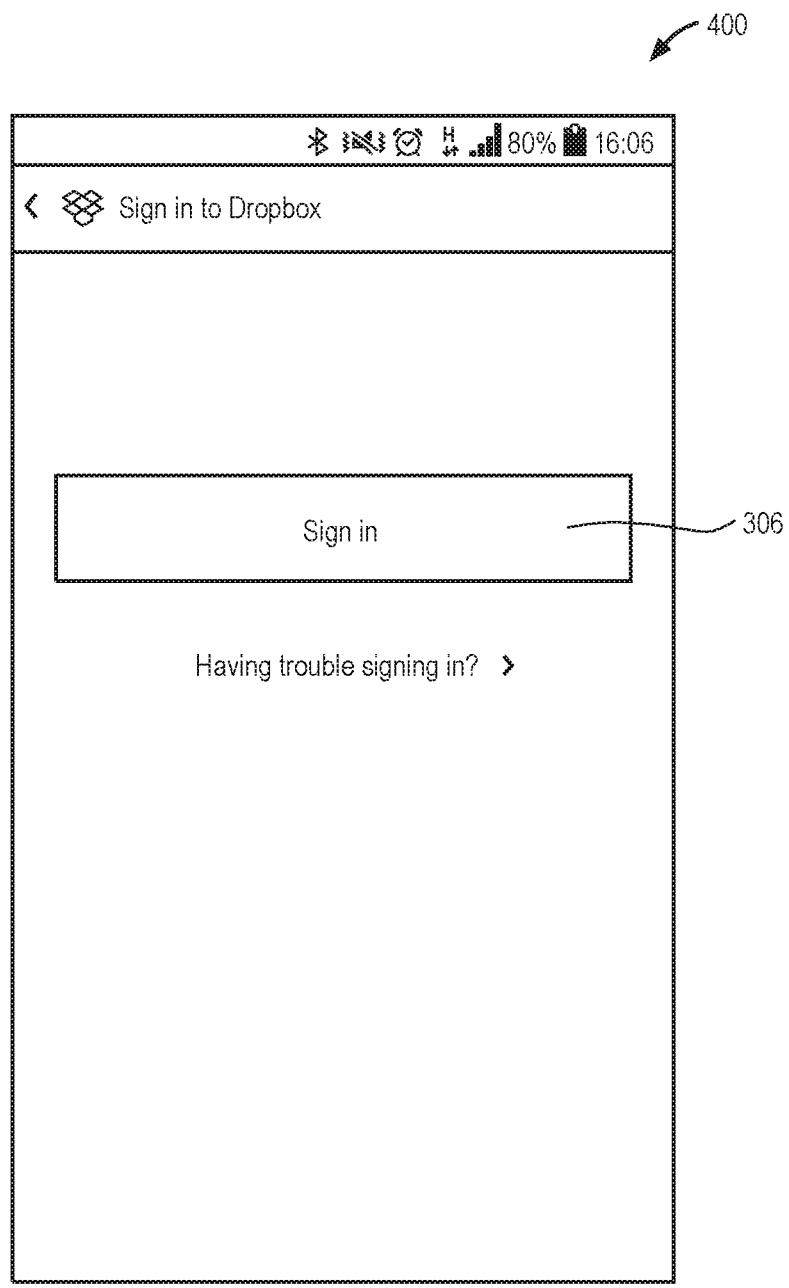
FIG. 4 is a screen capture illustrating an example of a modified log-in page, in accordance with an example embodiment.

FIG. 4 is a screen capture illustrating an example of a modified log-in page 400, in accordance with an example embodiment. In some example embodiments, the modified log-in page 400 represents the log-in page after it has been modified by the authentication service 104 in operation 214 of FIG. 2, described above.

As can be seen, the modified log-in page 400 does not contain input boxes for either an email address or a password, as these represent credentials whose mechanism for providing has been stripped from the log-in page 300 to produce the modified log-in page 400. The modified log-in page 400 does include the button 306 that the user presses to indicate his or her intention to sign-in to the third-party service 106A, 106B, which in some example embodiments is the user action detect in operation 220 of FIG. 2, described above.

Figure 5:
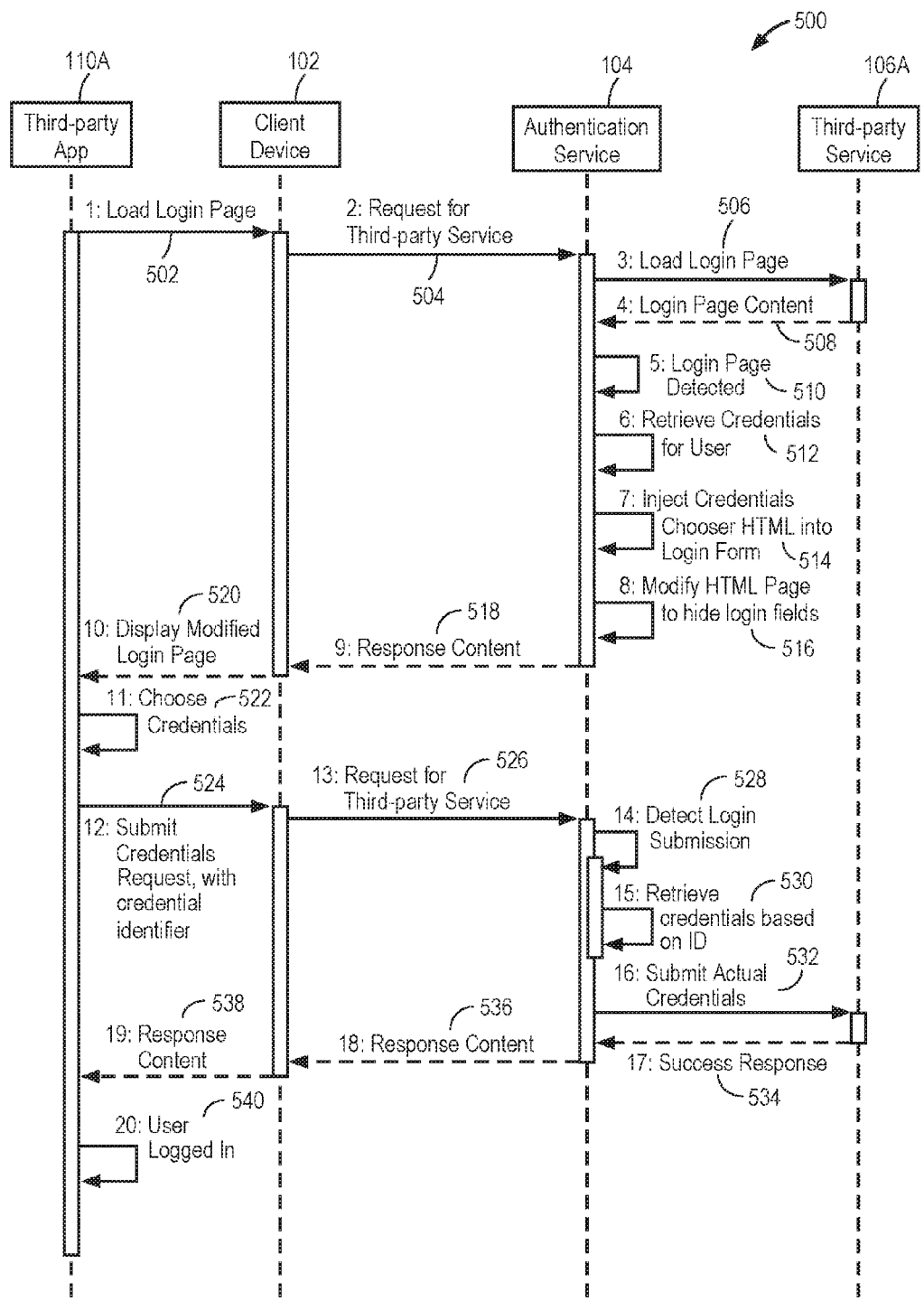
FIG. 5 is a sequence diagram illustrating a method, in accordance with an example embodiment, of full single sign-on with multi-credential support.

In an example embodiment, multi-credential single sign-on is also supported. Multi-credential refers to the case where a particular user has two or more possible credentials (or combinations of credentials) that can be used to log-in to the same third-party service 106A, 106B. For example, a user may maintain a personal account and a work account with the third-party service 106A, 106B, each account having its own associated email address and password. In such an instance, simply eliminating the ability of the user to enter or provide log-in credentials leaves open the question of which account the user wishes to log-in using. As such, FIG. 5 is a sequence diagram illustrating a method 500, in accordance with an example embodiment, of full single sign-on with multi-credential support.

As with FIG. 2, the method 500 is depicted as utilizing third-party application 112A, client device 102, authentication service 104 and third-party service 106A, although one of ordinary skill in the art will recognize that a similar method can be performed using third-party application 112B, client device 102, authentication service 104, and third-party service 106B.

At operation 502, the third-party application 112A attempts to load a log-in page by sending a request to the mobile device 102. In an example embodiment, this may be performed upon the user starting up the third-party application 112A. At operation 504, the client device 102 may then send a request for third-party service 106A to the authentication service 104. This request may be sent via a VPN connection between the client device 102 and the authentication service 104. In instances where the VPN connection is not yet established, the client device 102 may act to establish the VPN connection with the authentication service 104. This may be performed by using a VPN driver and/or other settings stored on the client device 102 and prompting the user for VPN credentials. In a sense, the VPN credentials act as the sole log-in credentials used for the user to access multiple third-party services 106A, 106B, although in some cases the VPN connection is already established by the time the user attempts to log-in. The request sent via the VPN connection may include an indication of the third-party service 106A that the third-party application 112A is associated with.

The VPN driver and other settings stored on the client device 102 may act to cause a request from third-party application 112A intended for the third-party service 106A to instead be rerouted to the authentication service 104. At operation 506, the authentication service 104 may send a request for the log-in page to the third-party service 106A. This information can be gleaned from the indication of the third-party service 106A. In some instances, the authentication service 104 may access a mapping or directory that provides the location of the third-party service 106A using the indication, such as a name of the third-party service.

At operation 508, the third-party service 106A returns the log-in page to the authentication service 104. At operation 510, the authentication service 104 detects the log-in page. This may include, for example, scanning the log-in page to determine what type of credentials the third-party service 106A is requesting in order to allow the user to log-in. For example, the authentication service 104 may scan a log-in page and determine that the log-in page has input boxes for user name and password and therefore determine that user name and password for the user are needed in order to complete the log-in page.

At operation 512, the authentication service 104 detects appropriate credentials for the user. This may include, for example, performing a look-up on a table or other data structure where user credentials for the user for this third-party service are stored. In some example embodiments, each user has a unique supported-application profile stored in a persistent store. In some example embodiments, the user may have provided the authentication service 104 with appropriate log-in credentials for the third-party service 106A at some point in the past. This providing may either be knowingly or non-knowingly. For example, the user may be prompted by the authentication service 104 the first time the user attempts to log-in to the third-party service 106A to provide the log-in credentials. In another example, the authentication service 104 may simply monitor the user entering his or her log-in credentials the first time the user attempts to log-in to the third-party service 106. In another example, the authentication service 104 may provide user details directly to the third-party service 106A, which may share the user's log-in credentials directly with the authentication service 104.

It should also be noted that, in operation 512, the authentication service 104 may also detect that the user has multiple possible credentials for the third-party service 106A. This may be because the user has multiple credentials stored in the appropriate entry in the table or other data structure, or in the users unique supported-application profile. In response to this determination, at operation 514 the authentication service 104 may inject a credentials chooser into the log-in page. The credentials chooser, when run by a user, allows the user to select among the user's multiple possible credentials with which to log-in.

At operation 516, the authentication service may modify the log-in page (which is the credentials chooser at this point) to hide the log-in fields. In an example embodiment, this may involve stripping HTML code for the log-in fields from the log-in page. This operation may vary greatly, however, depending on the form in which the credentials are to be provided and the typical process that the log-in page uses for the user to provide those credentials. Whatever mechanism is typically used for providing the credentials is hidden or removed so that a user, upon viewing or running the log-in page, does not perceive that the credentials are being requested.

At operation 518, the authentication service 104 may return response content including the modified log-in page to the client device 102. At operation 520, the mobile device may cause the display of the modified log-in page in the third-party application 112A.

At operation 522, the third-party application 112A may allow the user to choose the credentials with which to log-in, using the credentials chooser. At operation 524, the third-party application 112A may submit a credentials request to the client device 102. This request may include, in some example embodiments, an identification of the credential selected by the user (such as the email address associated with the account with which the user wants to log-in). This request may be generated based on user action, such as the user clicking a log-in button on the modified log-in page. At operation 526, the client device 102 submits a request for the third-party service 112A to the authentication service 104. At operation 528, the authentication service 104 detects the log-in submission. At operation 530, the authentication service 104 retrieves the appropriate credentials selected by the user, such as by using the credential identification.

At operation 532, the actual credentials, along with whatever other parameters are passed via the log-in page, are submitted to the third-party service 106A.

At operation 534, after verifying the actual credentials, the third-party service 106A may send a success response to the authentication service 104. At operation 536, the authentication service 104 may send response content to the client device 102, which at operation 538 passes it to the client application 112A. At operation 540, the client application 112A may notify the user that he or she has been logged in.

Figure 6:
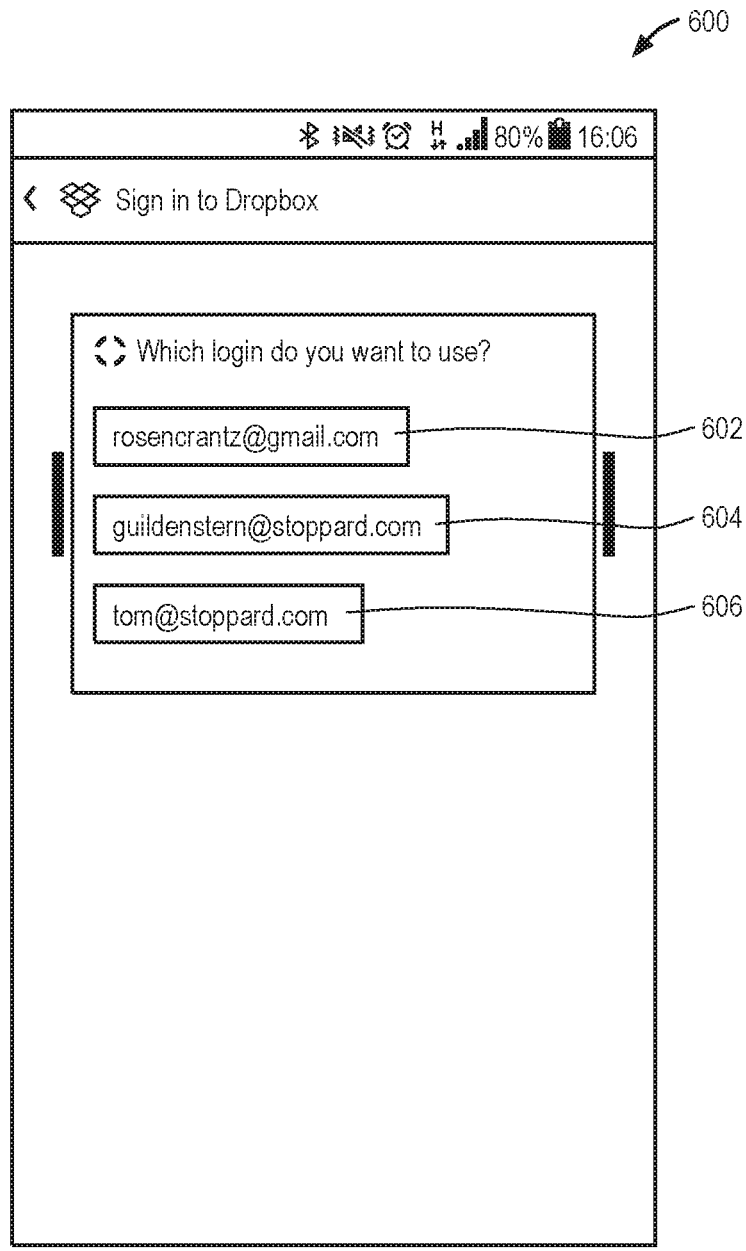
FIG. 6 is a screen capture illustrating an example of a log-in page, in accordance with an example embodiment.

FIG. 6 is a screen capture illustrating an example of a log-in page 600 in accordance with an example embodiment. In some example embodiments, the modified log-in page 600 represents the log-in page after the credentials chooser has been injected into it by the authentication service 104 in operation 514 of FIG. 5, described above.

As can be seen, the user is presented with three possible credentials 602, 604, 606 from which to select. The user selects which of these credentials 602, 604, 606 to use to log in, but does not need to provide a password. In this example embodiment, after selecting the credential, the user may be presented with a web page similar to that as presented in FIG. 4, allowing the user to indicate that he or she wishes to complete the log-in process.

The above techniques work well in cases where the third-party application 112A, 112B uses web pages as part of the log-in process. However, as described briefly above, there are cases where one or more of the third-party applications 112A, 112B do not utilize web pages as part of the log-in process, making it impossible, or at least difficult, to use a modified web page to present an alternative log-in mechanism to the user. As such, alternative techniques may be used to handle cases where one or more of the third-party applications 112A, 112B do not utilize web pages as part of the log-in process. For purposes of this document, cases where the user logs-in using a third-party application 112A, 112B that does utilize web pages as part of the log-in process shall be called "full single sign-on," whereas cases where the user logs-in using a third-party application 112A, 112B that does not utilize web pages as part of the log-in process shall be called "partial single sign-on."

Figure 7:
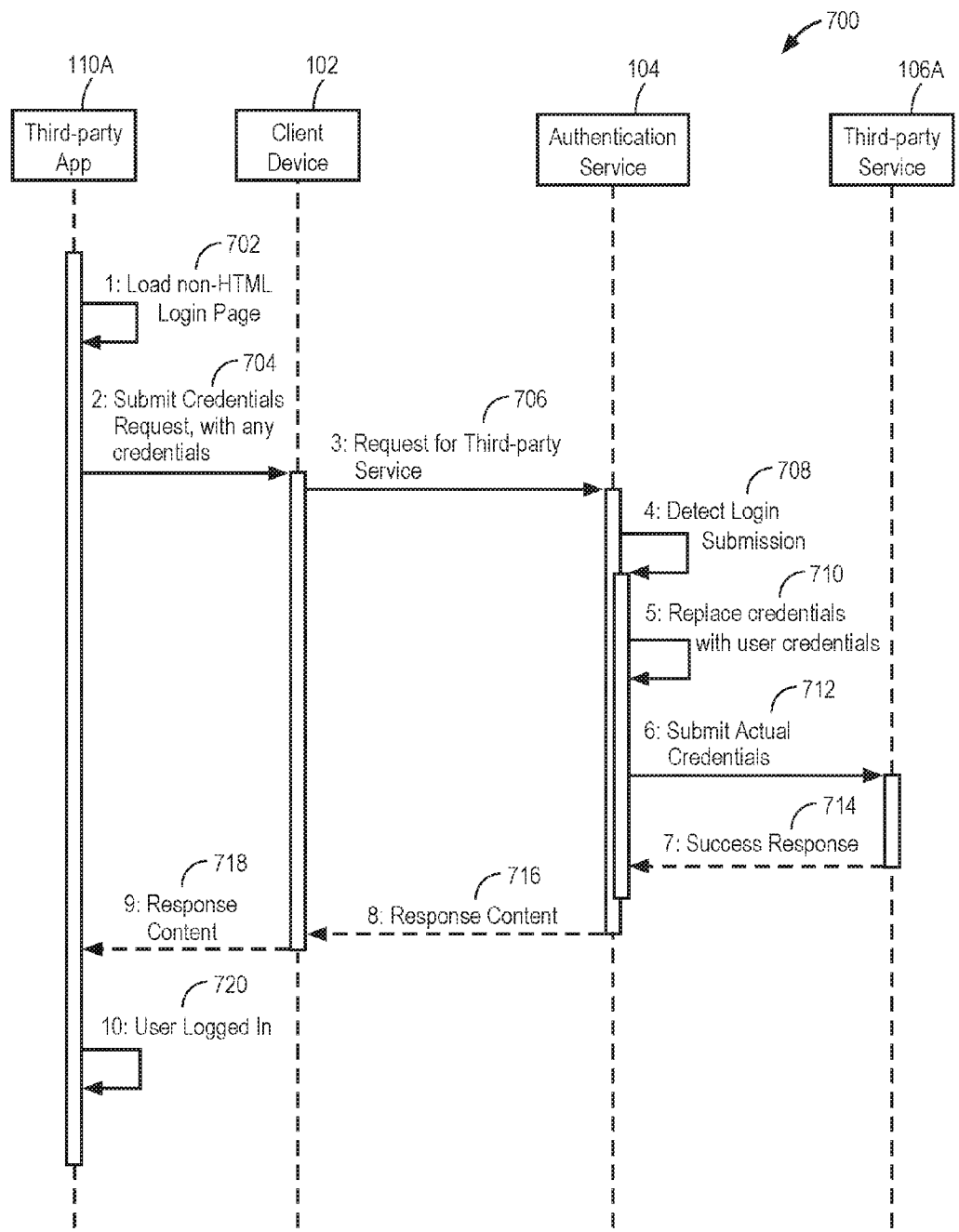
FIG. 7 is a sequence diagram illustrating a method, in accordance with an example embodiment, of partial single sign-on using a single credential.

FIG. 7 is a sequence diagram illustrating a method 700, in accordance with an example embodiment, of partial single sign-on using a single credential. This sequence diagram describes a method 700 that operates in the system of FIG. 1, described above. Specifically, this sequence diagram describes a method 700 that operates in a system where one or more of the third-party applications 112A, 112B ordinarily utilize a web page to present the user with the ability to enter or provide credentials.

The method 700 is depicted as utilizing third-party application 112A, client device 102, authentication service 104 and third-party service 106A, although one of ordinary skill in the art will recognize that a similar method can be performed using third-party application 112B, client device 102, authentication service 104, and third-party service 106B.

At operation 702, the third-party application 112A attempts to load the log-in mechanism. At operation 704, the third-party application submits a credentials request, along with any credentials provided by the user to the client device 102. The user may provide any credentials at this point, regardless of whether the credentials actually match established credentials or valid credentials for the user. At operation 706, the client device 102 may then send a request for third-party service 106A to the authentication service 104. This request may be sent via a VPN connection between the client device 102 and the authentication service 104. In instances where the VPN connection is not yet established, the client device 102 may act to establish the VPN connection with the authentication service 104. This may be performed by using a VPN driver and/or other settings stored on the client device 102 and prompting the user for VPN credentials. In a sense, the VPN credentials act as the sole log-in credentials used for the user to access multiple third-party services 106A, 106B, although in some cases the VPN connection is already established by the time the user attempts to log-in. The request sent via the VPN connection may include an indication of the third-party service 106A that the third-party application 112A is associated with.

The VPN driver and other settings stored on the client device 102 may act to cause a request from third-party application 112A intended for the third-party service 106A to instead be rerouted to the authentication service 104. At operation 708, the authentication service 104 detects a log-in submission. At operation 710, the authentication service 104 replaces the credentials submitted by the user with actual credentials for the user. This may include, for example, performing a look-up on a table or other data structure where user credentials for the user for this third-party service are stored. In some example embodiments, each user has a unique supported-application profile stored in a persistent store. In some example embodiments, the user may have provided the authentication service 104 with appropriate log-in credentials for the third-party service 106A at some point in the past. This providing may either be knowingly or non-knowingly. For example, the user may be prompted by the authentication service 104 the first time the user attempts to log-in to the third-party service 106A to provide the log-in credentials. In another example, the authentication service 104 may simply monitor the user entering his or her log-in credentials the first time the user attempts to log-in to the third-party service 106. In another example, the authentication service 104 may provide user details directly to the third-party service 106A, which may share the user's log-in credentials directly with the authentication service 104.

At operation 712, the actual credentials, along with whatever other parameters are passed via the log-in page, are submitted to the third-party service 106A.

At operation 714, after verifying the actual credentials, the third-party service 106A may send a success response to the authentication service 104. At operation 716, the authentication service 104 may send response content to the client device 102, which at operation 718 passes it to the client application 112A. At operation 720, the client application 112A may notify the user that he or she has been logged in.

Figure 8:
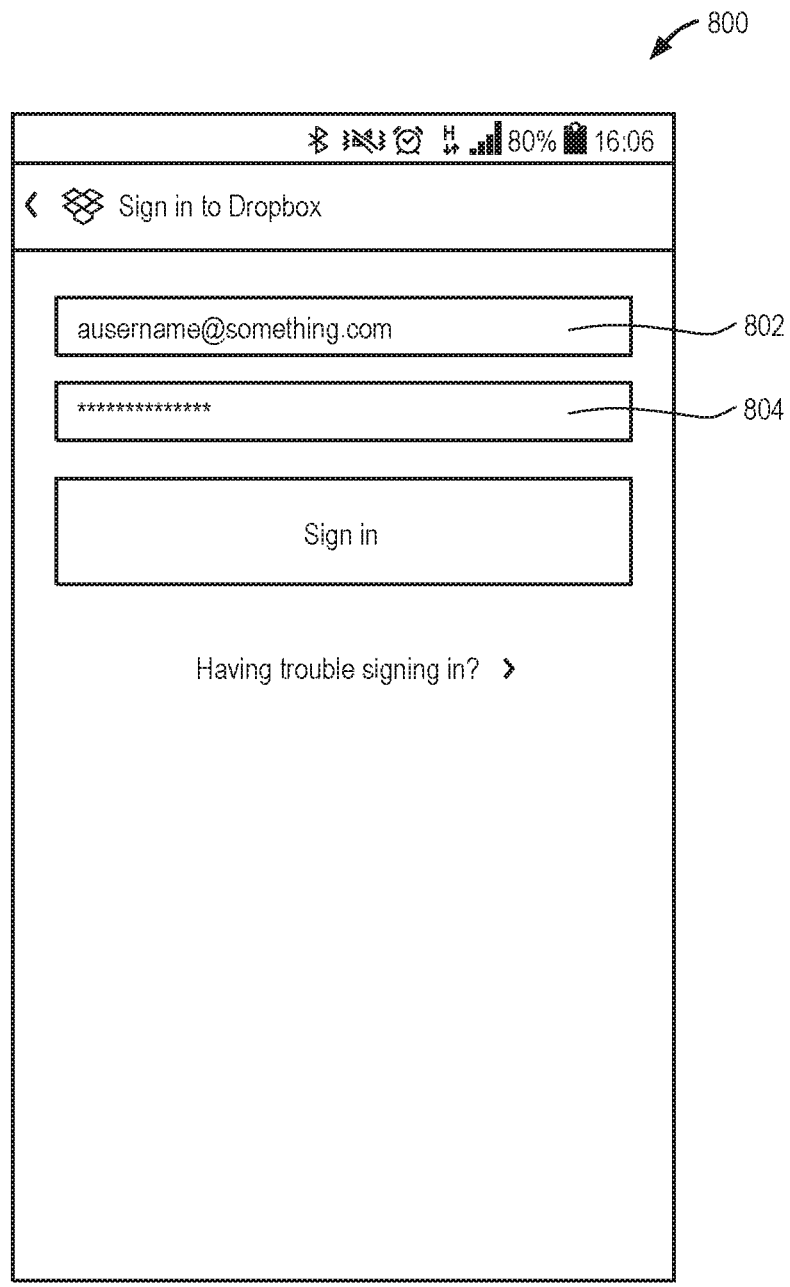
FIG. 8 is a screen capture illustrating an example of a log-in screen for partial single sign-on, in accordance with an example embodiment.

FIG. 8 is a screen capture illustrating an example of a log-in screen 800 for partial single sign-on, in accordance with an example embodiment. Here the user has entered an email address 802 and password 804, but the email address 802 and password 804 could be anything as the authentication service 104 is going to ignore them and insert the proper credentials for the user at, for example, operation 712 of FIG. 7 described above.

Multi-credential support in the partial single sign-on case may be even more complicated. Due to the lack of the ability of the authentication service 104 to alter the log-in mechanism for the third-party application 112A, 112B, an additional component is added to the system in some example embodiments.

Figure 9:
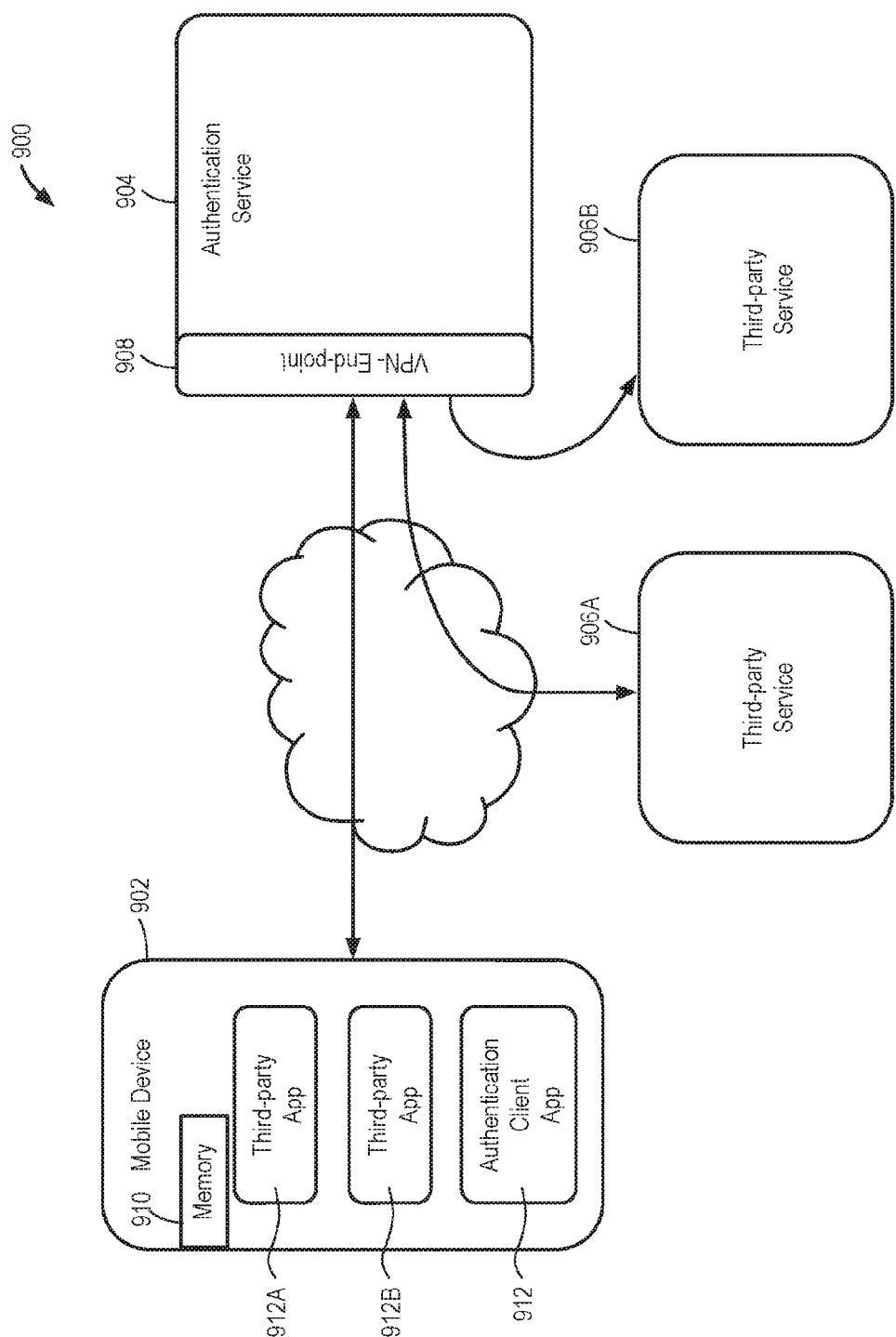

FIG. 9 is a block diagram illustrating a system 900, in accordance with an example embodiment, providing multi-credential support for partial single sign-on. The system may include a client device 902, an authentication service 904, and one or more third-party services 906A, 906B. The client device 902 may be, for example, a mobile device such as a smartphone or tablet, or a more traditional computing device, such as a laptop or desktop computer. The client device 902 may connect to the authentication service 904 via a VPN endpoint 908. In order to access the VPN endpoint 908, the client device 902 may store various VPN settings in a memory 910. In some example embodiments, a VPN driver or other software may be installed on the client device 902 in order to facilitate a VPN connection between the client device 902 and the authentication service 904.

The client device 902 may also contain one or more third-party applications 912A, 912B, sometimes called "apps." Each application 912A, 912B may represent a client application for a corresponding server application running on a different third-party service 906A, 906B. Thus, for example, third-party application 912A may be a client application for a server application running on third-party service 906A, while third-party application 912B may be a client application for a server application running on third-party service 906B.

In an example embodiment, in order to provide multi-credential support for partial single sign-on, an authentication client application 912 is also installed on the client device 902. The authentication client application 912 provides the user with the ability to select from among the possible credentials with which to log-in. The authentication client application 912 can communicate with the user in a number of different ways. In one example embodiment, the authentication client application 912 communicates with the clients via push notifications on the client device 902.

Figure 10:
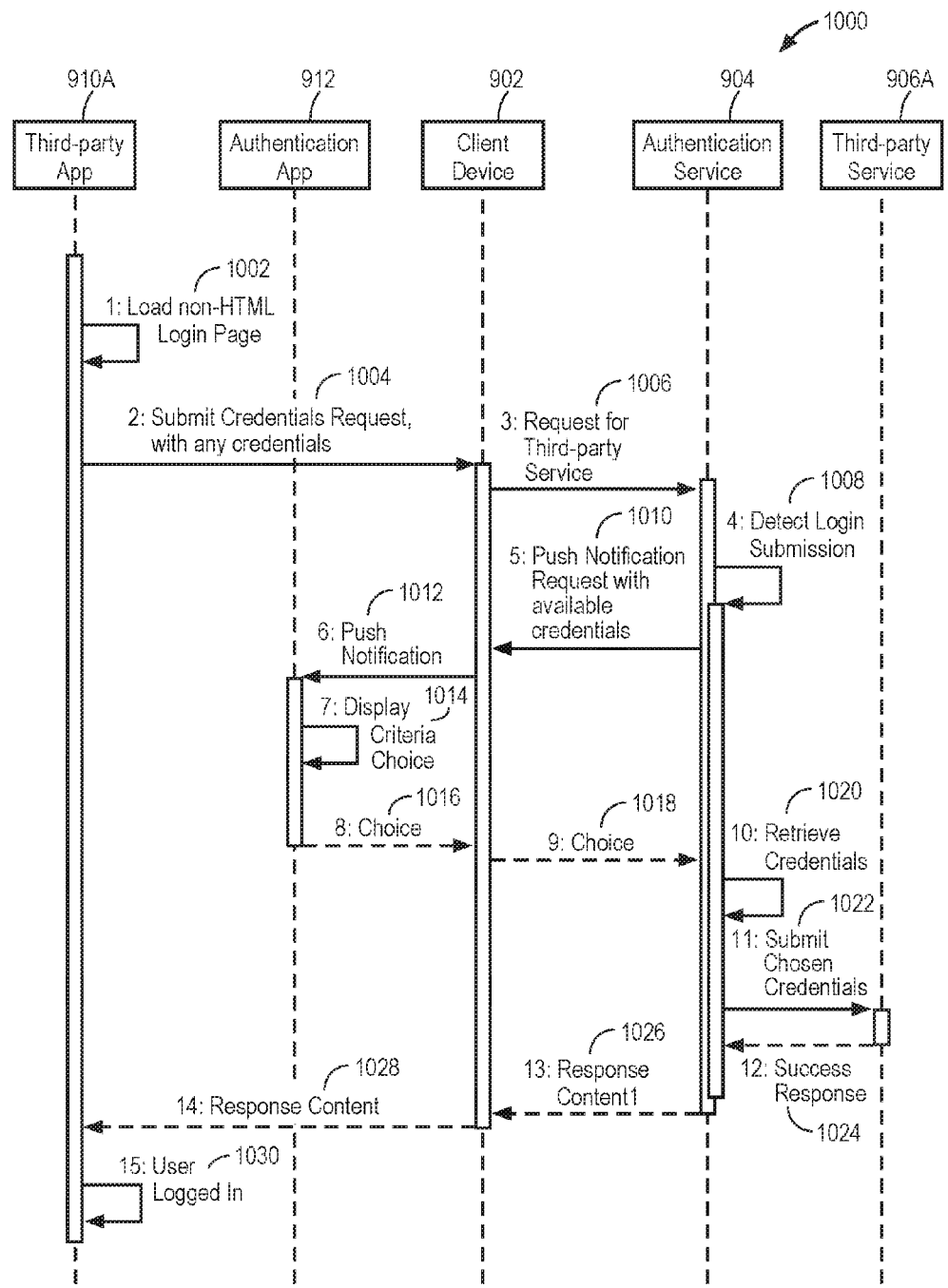
FIG. 10 is a sequence diagram illustrating a method, in accordance with an example embodiment, of partial single sign-on with multi-credential support.

FIG. 10 is a sequence diagram illustrating a method 1000, in accordance with an example embodiment, of partial single sign-on with multi-credential support.

The method 1000 is depicted as utilizing third-party application 912A, authentication client application 912, client device 902, authentication service 904, and third-party service 906A, although one of ordinary skill in the art will recognize that a similar method can be performed using third-party application 912B, client device 902, authentication service 904, and third-party service 906B.

At operation 1002, the third-party application 912A attempts to load the log-in mechanism. At operation 1004, the third-party application submits a credentials request, along with any credentials provided by the user to the client device 902. The user may provide any credentials at this point, regardless of whether the credentials actually match established credentials or valid credentials for the user. At operation 1006, the client device 902 may then send a request for third-party service 906A to the authentication service 904. This request may be sent via a VPN connection between the client device 902 and the authentication service 904. In instances where the VPN connection is not yet established, the client device 902 may act to establish the VPN connection with the authentication service 904. This may be performed by using a VPN driver and/or other settings stored on the client device 902 and prompting the user for VPN credentials. In a sense, the VPN credentials act as the sole log-in credentials used for the user to access multiple third-party services 906A, 906B, although in some cases the VPN connection is already established by the time the user attempts to log-in. The request sent via the VPN connection may include an indication of the third-party service 906A that the third-party application 912A is associated with.

The VPN driver and other settings stored on the client device 902 may act to cause a request from third-party application 912A intended for the third-party service 906A to instead be rerouted to the authentication service 904. At operation 1008, the authentication service 904 detects a log-in submission. It should also be noted that in operation 1008 the authentication service 904 may also detect that the user has multiple possible credentials for the third-party service 906A. This may be because the user has multiple credentials stored in the appropriate entry in the table or other data structure, or in the users unique supported-application profile. In response to this determination, at operation 1010, the authentication service 904 may send a push notification request with the available credentials for the user to the client device 902.

At operation 1012, the client device 902 may forward the push notification to the authentication client application 912, which at operation 1014 may display the credential choice to the user. Once the user has made his or her selection, at operation 1016 the authentication client application 912 can send this choice to the client device 902, which at operation 1018 sends the choice to the authentication service 904.

At operation 1020, the authentication service 904 retrieves the credentials associated with the user's choice. This may include, for example, performing a look-up on a table or other data structure where user credentials for the user for this third-party service are stored. In some example embodiments, each user has a unique supported-application profile stored in a persistent store. In some example embodiments, the user may have provided the authentication service 904 with appropriate log-in credentials for the third-party service 906A at some point in the past. This providing may either be knowingly or non-knowingly. For example, the user may be prompted by the authentication service 904 the first time the user attempts to log-in to the third-party service 906A to provide the log-in credentials. In another example, the authentication service 904 may simply monitor the user entering his or her log-in credentials the first time the user attempts to log-in to the third-party service 906. In another example, the authentication service 904 may provide user details directly to the third-party service 906A, which may share the user's log-in credentials directly with the authentication service 904.

At operation 1022, the actual credentials, along with whatever other parameters are passed via the log-in page, are submitted to the third-party service 906A.

At operation 1024, after verifying the actual credentials, the third-party service 906A may send a success response to the authentication service 904. At operation 1026, the authentication service 904 may send this response content to the client device 902, which at operation 1028 passes it to the client application 912A. At operation 1030, the client application 912A may notify the user that he or she has been logged in.

Figure 11:
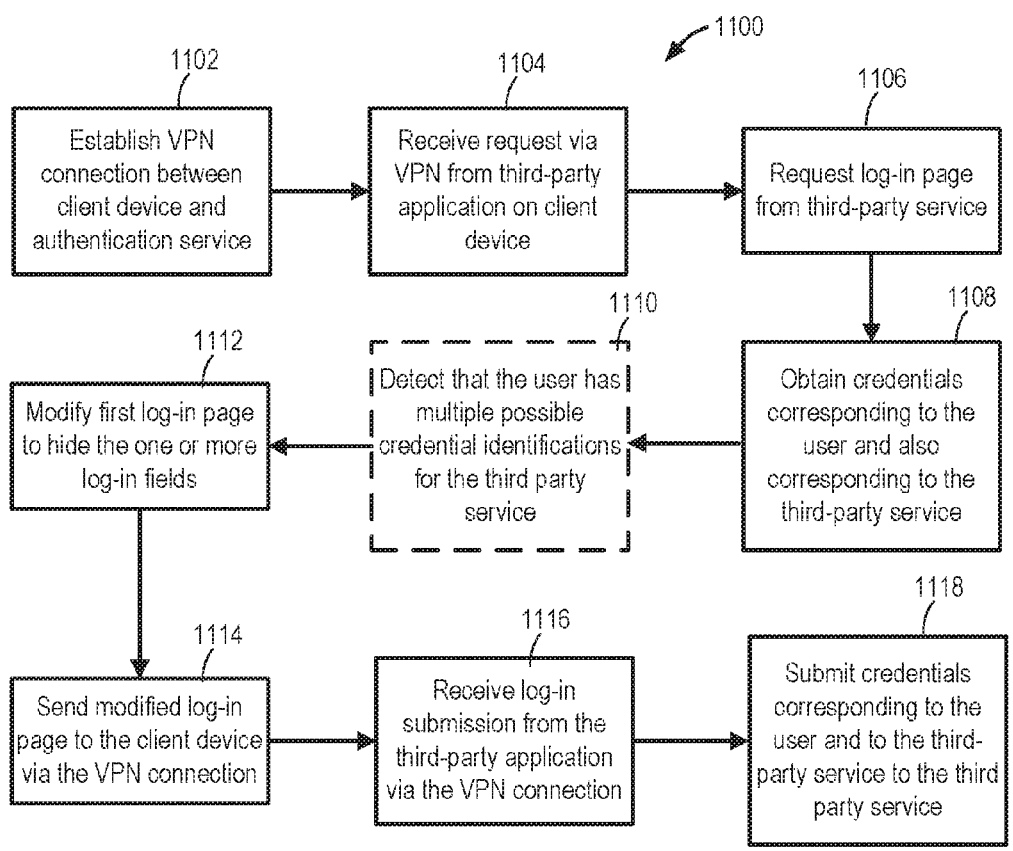

FIG. 11 is a flow diagram illustrating a method 1100, in accordance with an example embodiment, of providing full single sign-on. The method 1100 may be performed by, for example, an authentication service.

At operation 1102, a VPN connection is established between a client device and the authentication service. This may include the client device passing one or more VPN credentials, such as a VPN user name and password, to the authentication service. This may also include establishing a VPN tunnel between the client device and the authentication service. At operation 1104, a request is received via the VPN from a third-party application on the client device. The request may be a request for a third-party service and may be triggered by the user starting up the third-party application.

At operation 1106, a log-in page is requested from the third-party service. The log-in page may include one or more log-in fields usable to enter credential information. At operation 1108, credentials corresponding to the user and also corresponding to the third-party service may be obtained. In the case where there is multi-credential support, at operation 1110 it is detected that the user has multiple possible credential identifications for the third-party service. This is shown in dashed lines to indicate that this operation is not necessarily present in cases where there is no multi-credential support. At operation 1112, the first log-in page is modified to hide the one or more log-in fields. This may include injecting a credentials chooser into the log-in page in cases where there is multi-credential support. The credentials chooser, when run, presents the user with a choice of the multiple possible credential identifications.

At operation 1114, the modified log-in page is sent to the client device via the VPN connection. At operation 1116, a log-in submission may be received from the third-party application via the VPN connection. This may include receiving a selection of one of the multiple possible credential identifications in cases where there is multi-credential support. At operation 1118, the credentials corresponding to the user and to the third-party service are submitted to the third-party service to log-in the user to the third-party service.

Figure 12:
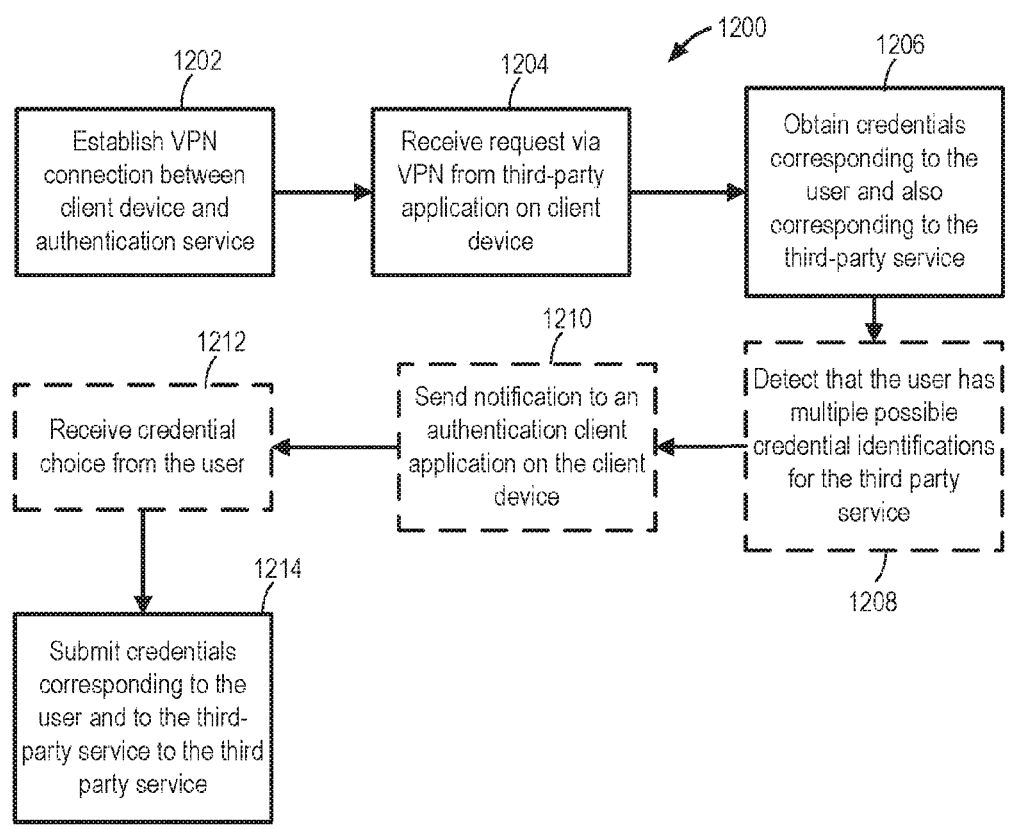

FIG. 12 is a flow diagram illustrating a method 1200, in accordance with an example embodiment, of providing partial single sign-on. The method 1200 may be performed by, for example, an authentication service.

At operation 1202, a VPN connection is established between a client device and the authentication service. This may include the client device passing one or more VPN credentials, such as a VPN user name and password, to the authentication service. This may also include establishing a VPN tunnel between the client device and the authentication service. At operation 1204, a request is received via the VPN from a third-party application on the client device. The request may be a request for a third-party service and may be triggered by the user submitting user credentials (possibly incorrect) in the third-party application. At operation 1206, credentials corresponding to the user and also corresponding to the third-party service may be obtained. In the case where there is multi-credential support, at operation 1208 it is detected that the user has multiple possible credentials for the third-party service. This is shown in dashed lines to indicate that this operation is not necessarily present in cases where there is no multi-credential support. Also in the case where there is multi-credential support, at operation 1210 a notification is sent to an authentication client application on the client device. The notification may include the multiple possible credentials and be designed to trigger the authentication client application to notify the user of the multiple possible credentials and obtain a credential choice from the user. Also in the case where there is multi-credential support, at operation 1212 the credential choice is received from the authentication client application.

At operation 1214, the credentials corresponding to the user and to the third-party service are submitted to the third-party service to log-in the user to the third-party service. In the case where there is multi-credential support, this may include submitting the credential choice to the third-party service.

Example Mobile Device

Figure 13:
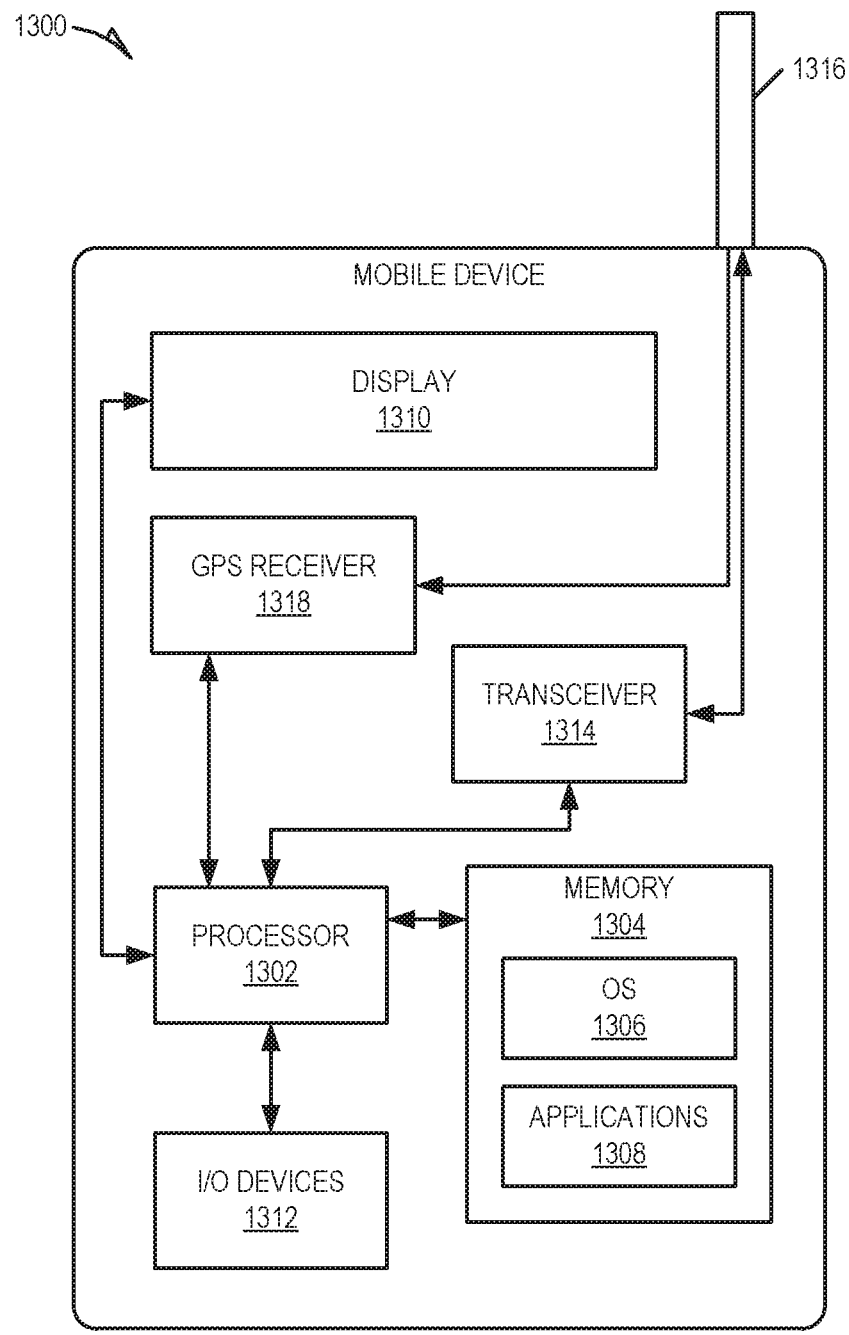
FIG. 13 is a block diagram illustrating a mobile device, according to an example embodiment.

FIG. 13 is a block diagram illustrating a mobile device 1300, according to an example embodiment. The mobile device 1300 can include a processor 1302. The processor 1302 can be any of a variety of different types of commercially available processors suitable for mobile devices 1300 (for example, an XScale architecture microprocessor, a Microprocessor without Interlocked Pipeline Stages (MIPS) architecture processor, or another type of processor). A memory 1304, such as a random access memory (RAM), a Flash memory, or other type of memory, is typically accessible to the processor 1302. The memory 1304 can be adapted to store an operating system (OS) 1306, as well as application programs 1308, such as a mobile location enabled application that can provide LBSs to a user. The processor 1302 can be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 can be coupled to a transceiver 1314 that interfaces with an antenna 1316. The transceiver 1314 can be configured to both transmit and receive cellular network signals, wireless data signals, or other types of signals via the antenna 1316, depending on the nature of the mobile device 1300. Further, in some configurations, a GPS receiver 1318 can also make use of the antenna 1316 to receive GPS signals.

Modules, Components and Logic

Certain embodiments are described herein as including logic or a number of components, modules, or mechanisms.

Modules can constitute either software modules (e.g., code embodied (1) on a non-transitory machine-readable medium or (2) in a transmission signal) or hardware-implemented modules. A hardware-implemented module is tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs).)

Electronic Apparatus and System

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Example Machine Architecture and Machine-Readable Medium

Figure 14:
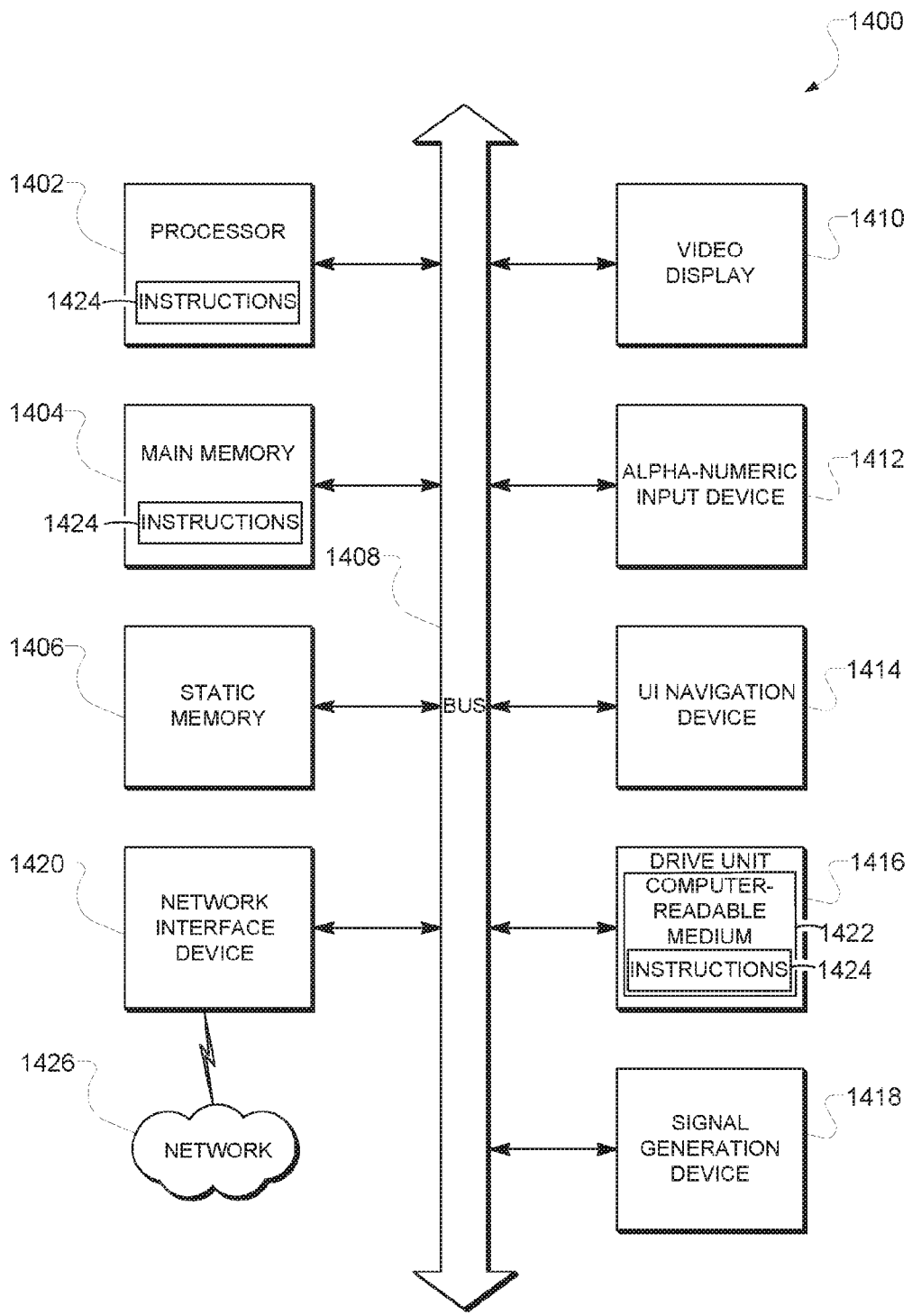
FIG. 14 is a block diagram of machine in the example form of a computer system within which instructions, for causing the machine to perform any one or more of the methodologies discussed herein, can be executed.

FIG. 14 is a block diagram of machine in the example form of a computer system 1400 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404, and a static memory 1406, which communicate with each other via a bus 1408. The computer system 1400 can further include a video display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation device 1414 (e.g., a mouse), a disk drive unit 1416, a signal generation device 1418 (e.g., a speaker), and a network interface device 1420.

Machine-Readable Medium

The disk drive unit 1416 includes a machine-readable medium 1422 on which is stored one or more sets of instructions and data structures (e.g., software) 1424 embodying or utilized by any one or more of the methodologies or functions described herein. The instructions 1424 can also reside, completely or at least partially, within the main memory 1404 and/or within the processor 1402 during execution thereof by the computer system 1400, with the main memory 1404 and the processor 1402 also constituting machine-readable media 1422.

While the machine-readable medium 1422 is shown in an example embodiment to be a single medium, the term "machine-readable medium" can include a single medium or multiple media (e.g., a centralized or distributed database, and/or associated caches and servers) that store the one or more instructions or data structures 1424. The term "machine-readable medium" shall also be taken to include any tangible medium that is capable of storing, encoding or carrying instructions 1424 for execution by the machine and that cause the machine to perform any one or more of the methodologies of the present disclosure, or that is capable of storing, encoding or carrying data structures utilized by or associated with such instructions 1424. The term "machine-readable medium" shall accordingly be taken to include, but not be limited to, solid-state memories, and optical and magnetic media. Specific examples of machine-readable media 1422 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1424 can further be transmitted or received over a communications network 1426 using a transmission medium. The instructions 1424 can be transmitted using the network interface device 1420 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1424 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method of providing single sign-on, comprising:
establishing a virtual private network (VPN) connection between a client device and an authentication service;
receiving, at the authentication service, via the VPN connection, a request from a third-party application on the client device, the request for a third-party service, the request also including first credentials entered by a user;
obtaining, at the authentication service, a log-in web page corresponding to the third-party service;
scanning the log-in page to determine a credential type associated with the log-in web page;
obtaining second credentials, of the determined credential type, corresponding to a user of the client device and also uniquely corresponding to the third-party service;
submitting, to the third-party service, the second credentials by filling in the log-in web page with the second credentials.

2. The method of claim 1, further comprising:
detecting that the user has multiple possible credentials for the third-party service;
sending a notification to an authentication client application on the client device, the notification including the multiple possible credentials and designed to trigger the authentication client application to notify the user of the multiple possible credentials and obtain a credential choice from the user;
receiving the credential choice from the authentication client application; and
wherein the submitting the second credentials comprises submitting second credentials corresponding to the selection.

3. The method of claim 2, wherein the sending a notification comprises sending a push notification.

4. A system comprising:
an authentication client application operating on a client device; and
an authentication service comprising one or more processors and configured to:
establish a virtual private network (VPN) connection between a client device and an authentication service;
receive at the authentication service, via the VPN connection, a request from a third-party application on the client device, the request for a third-party service, the request also including first credentials entered by a user;
obtain, at the authentication service, a log-in web page corresponding to the third-party service;
scan the log-in page to determine a credential type associated with the log-in web page;
obtain second credentials, of the determined credential type, corresponding to a user of the client device and also uniquely corresponding to the third-party service;
detect that the user has multiple possible credentials for the third-party service;
send a notification to the authentication client application on the client device, the notification including the multiple possible credentials and designed to trigger the authentication client application to notify the user of the multiple possible credentials and obtain a credential choice from the user;
receive the credential choice from the authentication client application; and
submit the second credentials corresponding to the selection to the third-party service to log-in the user to the third-party service by filling in the log-in web page with the credential choices.

5. The system of claim 4, wherein the client device is a mobile device.

6. A non-transitory machine-readable storage medium comprising instructions, which when implemented by one or more machines, cause the one or more machines to perform operations comprising:
establishing a virtual private network (VPN) connection between a client device and an authentication service;
receiving, at the authentication service, via the VPN connection, a request from a third-party application on the client device, the request for a third-party service, the request also including first credentials entered by a user;
obtaining, at the authentication service, a log-in web page corresponding to the third-party service;
scanning the log-in page to determine a credential type associated with the log-in web page;
obtaining second credentials, of the determined credential type, corresponding to a user of the client device and also uniquely corresponding to the third-party service;
submitting, to the third-party service, the second credentials by filling in the log-in web page with the second credentials.

7. The non-transitory machine-readable storage medium of claim 6, wherein the operations further comprise:
detecting that the user has multiple possible credentials for the third-party service;
sending a notification to an authentication client application on the client device, the notification including the multiple possible credentials and designed to trigger the authentication client application to notify the user of the multiple possible credentials and obtain a credential choice from the user;
receiving the credential choice from the authentication client application; and
wherein the submitting the second credentials comprises submitting second credentials corresponding to the selection.

8. The non-transitory machine-readable storage medium of claim 7, wherein the sending a notification comprises sending a push notification.

9. The method of claim 1, further comprising modifying a log-in page using the credentials, wherein the modifying the log-in page includes removing code corresponding to the one or more log-in fields from code in the programming code representation of the log-in page.

10. The method of claim 1, further comprising modifying a log-in page using the credentials, wherein the modifying the log-in page includes inserting code in the programming code representation of the log-in page, the code causing the one or more fields to not be visible to the user when the log-in page is displayed.

11. The method of claim 1, wherein the receiving a log-in submission comprises receiving dummy credentials; and
wherein the submitting the credentials includes replacing the dummy credentials with the credentials corresponding to the user and to the third-party service.

12. The method of claim 1, wherein the obtaining credentials comprises obtaining credentials from a data store managed by the authentication service.

13. The non-transitory machine-readable storage medium of claim 7, wherein the operations further comprise modifying the log-in page includes removing code corresponding to the one or more log-in fields from the log-in page.

14. The non-transitory machine-readable storage medium of claim 7, wherein the operations further comprise modifying the log-in page includes inserting code in the log-in page, the code causing the one or more fields to not be visible to the user when the log-in page is displayed.

15. The non-transitory machine-readable storage medium of claim 7, wherein the receiving a log-in submission comprises receiving dummy credentials; and
    wherein the submitting the credentials includes replacing the dummy credentials with the credentials corresponding to the user and to the third-party service.

16. The non-transitory machine-readable storage medium of claim 7, wherein the obtaining credentials comprises obtaining credentials from a data store managed by the authentication service.

\* \* \* \* \*